(12) United States Patent
Kawakami et al.

(10) Patent No.: US 9,218,800 B2
(45) Date of Patent: Dec. 22, 2015

(54) SOUND TRANSMISSION MATERIAL, SOUND CONTROL PLANE STRUCTURE INCLUDING BUILDING USE USING THE SOUND TRANSMISSION MATERIAL, WINDSCREEN FOR MICROPHONE, PROTECTIVE GRILLE, SOUND TRANSMISSION PROJECTION SCREEN, AND SPEAKER

(75) Inventors: Fukushi Kawakami, Hamamatsu (JP); Takayuki Sano, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 14 days.

(21) Appl. No.: 14/005,083

(22) PCT Filed: Aug. 30, 2012

(86) PCT No.: PCT/JP2012/071988
§ 371 (c)(1),
(2), (4) Date: Sep. 13, 2013

(87) PCT Pub. No.: WO2013/038915
PCT Pub. Date: Mar. 21, 2013

(65) Prior Publication Data
US 2014/0233781 A1   Aug. 21, 2014

(30) Foreign Application Priority Data

Sep. 12, 2011   (CN) .............................. 2011 1 98418

(51) Int. Cl.
| | | |
|---|---|---|
| D04H 1/4234 | (2012.01) | |
| G10K 11/162 | (2006.01) | |
| G10K 11/18 | (2006.01) | |
| D04H 1/46 | (2012.01) | |
| E04B 1/80 | (2006.01) | |

(Continued)

(52) U.S. Cl.
CPC ............ *G10K 11/162* (2013.01); *D04H 1/4234* (2013.01); *D04H 1/46* (2013.01); *E04B 1/80* (2013.01); *E04B 1/994* (2013.01); *G10K 11/18* (2013.01); *H04B 1/086* (2013.01); *E04B 2001/8452* (2013.01)

(58) Field of Classification Search
CPC ..... A01N 37/36; A01N 25/30; D04H 1/4234; D04H 1/46
See application file for complete search history.

(56) References Cited

U.S. PATENT DOCUMENTS 1,975,604 A * 10/1934 Hanson ........................... 181/30
2,944,622 A *  7/1960 Dobbins ....................... 181/294

(Continued)

FOREIGN PATENT DOCUMENTS

| JP | 52/106717 | 9/1977 |
| JP | 9-037371 | 2/1997 |

(Continued)

OTHER PUBLICATIONS

Translation of JP 2010-0596658 A, accessed Apr. 21, 2015 from JPO website.*

(Continued)

*Primary Examiner* — Jeremy Luks
(74) *Attorney, Agent, or Firm* — Jordan and Hamburg LLP (57) ABSTRACT

A sound transmission material is made of fibers entangled with each other and has a self-standing property and a high performance sound transmission property, namely the TABER™ stiffness is not less than 5 mN×m, the bending resistance is not less than 100 mN, the porosity is not less than 50%, and the thickness is not more than 3 mm.

15 Claims, 5 Drawing Sheets (51) Int. Cl.
*E04B 1/99* (2006.01)
*H04B 1/08* (2006.01)
*E04B 1/84* (2006.01)

(56) References Cited

U.S. PATENT DOCUMENTS

| | | | | |
|---|---|---|---|---|
| 3,621,934 | A | * | 11/1971 | Thrasher et al. ............... 181/290 |
| 4,194,329 | A | * | 3/1980 | Wendt ............................. 52/145 |
| 4,226,299 | A | * | 10/1980 | Hansen .......................... 181/284 |
| 4,842,097 | A | * | 6/1989 | Woodward et al. ............ 181/286 |
| 4,925,291 | A | * | 5/1990 | Anger et al. ................... 351/123 |
| 4,966,252 | A | * | 10/1990 | Drever ............................ 181/158 |
| 5,131,051 | A | * | 7/1992 | Kishinaga et al. ............... 381/82 |
| 5,421,936 | A | * | 6/1995 | Cox et al. ....................... 156/202 |
| 5,504,281 | A | * | 4/1996 | Whitney et al. ................ 181/286 |
| 6,199,656 | B1 | * | 3/2001 | Vento et al. .................... 181/200 |
| 6,446,751 | B1 | * | 9/2002 | Ahuja et al. ................... 181/295 |
| 2013/0272551 | A1 | * | 10/2013 | Barnas ........................... 381/160 |

FOREIGN PATENT DOCUMENTS

| | | |
|---|---|---|
| JP | 2006-094029 | 4/2006 |
| JP | 2008-065046 | 3/2008 |
| JP | 2010-059658 | 3/2010 |
| JP | 2010-210778 | 9/2010 |

OTHER PUBLICATIONS

Translation of JP 2010-210778 A, accessed Apr. 21, 2015 from JPO website.*
"Acoustic Characteristics of Perforated Plate" written by Nakai, Kawakami, Wada, and Sano, the Accoustical Society of Japan, Material for Technical Committee on Architectural Acoustics (AA2009-18), Mar. 11, 2009.

* cited by examiner

(A) Image of wind noise measurement (a1 and a2 are cylindrical windscreens; and in b1 and b2, a single sound transmission material plate according to the present invention is installed in front of a microphone)

(B) Wind noise measurement according to the measurement block (a) mentioned in the left column

FIG. 12

Relationship between porosity and vertical incident sound absorption coefficient

SOUND TRANSMISSION MATERIAL, SOUND CONTROL PLANE STRUCTURE INCLUDING BUILDING USE USING THE SOUND TRANSMISSION MATERIAL, WINDSCREEN FOR MICROPHONE, PROTECTIVE GRILLE, SOUND TRANSMISSION PROJECTION SCREEN, AND SPEAKER

BACKGROUND OF THE INVENTION

The present invention relates to a sound transmission material formed by non-woven textile material and, more particularly, to a sound transmission material having a self-standing property. The present Invention further relates to a sound control plane structure including building use to which the sound, transmission material is applied, a windscreen for microphone, a protective grille, a sound transmission projection screen, and a speaker.

In various fields such as construction and electronics, a sound transmission material is required. As the sound transmission material, there are, for example, a mesh construction such as a saran net of a speaker and a perforated plate used in a construction wall surface.

As that being different from the above conventional sound transmission material, a plate-like sound transmission member and a sheet-like sound, transmission member have been proposed as materials which almost completely transmit sound, although they appear to having no transmission property because they have a hard texture apparently and have no opening or have openings which cannot be visually confirmed (JP 2010-59658 A).

There have been reported that a large number of pores, having a size small enough to avoid visual confirmation in appearance; are provided per area on a hard plate as a plate-like sound transmission material, whereby the sound, transmission property is obtained (JP 2010-59658 A and JP 2010-210778 A and "Acoustic Characteristics of Perforated Plate" writ ten by Nakai, Kawakami, Wada, and Sano, the Acoustical Society of Japan, Material for Technical Committee on Architectural Acoustics (AA2009-18), 2009 Mar. 11). Since a hard sound transmission material is obtained by the sound transmission material, there has been proposed to apply the sound transmission material as a movie screen and install a speaker on the back surface of the screen to enhance the sense of presence.

SUMMARY OF INVENTION

In uses as building materials and so on, when a sound transmission material is provided upright, the sound transmission material may be required to have a self-standing property with which the sound transmission material can holds its standing state by the strength of the sound transmission material itself even if an auxiliary mechanism or the like is not provided. According to the sound transmission material disclosed in JP 2010-53658 A, there is a problem that if the self-standing property is to be given to the sound transmission material, the sound transmission property is lost. According to the sound transmission materials disclosed in JP 2010-210778 A and "Acoustic Characteristics of Perforated Plate" written by Nakai, Kawakami, Wada, and Sano, the Acoustical Society of Japan, Material for Technical Committee on Architectural Acoustics (AA2009-18), 2009 Mar. 11, although the sound transmission materials have the self-standing property, the large number of pores are required to be provided, and therefore, there is a problem that the manufacturing cost is increased due to a special perforation technology and training of skilled workers. Thus, an object of the present invention is to provide a sound transmission material which uses a material formed by entangling fibers, and has the self-standing property and a high-performance sound transmission property.

As a result of studies on a textile material simultaneously achieving the self-standing property and the sound transmission property, the present inventor has found that there is a problem in that when an amount of fibers used in the textile material is increased to secure the self-standing property, the density of fibers increases too much, and the fibers are so entangled that the sound transmission is interfered.

Namely, the sound energy reflection coefficient $|r^2|$ (here, r is acoustic reflectivity) on a material boundary surface is represented by the following formula (1):

[Formula 1]

$$|r^2| = \left|\frac{Z_n\cos\theta - \rho c}{Z_n\cos\theta + \rho c}\right|^2 \xrightarrow{\text{Vertical incidence } \theta=0} \left|\frac{Z_n - \rho c}{Z_n + \rho c}\right|^2 = \left|\frac{\zeta - 1}{\zeta + 1}\right|^2 \quad (1)$$

Figure 12:
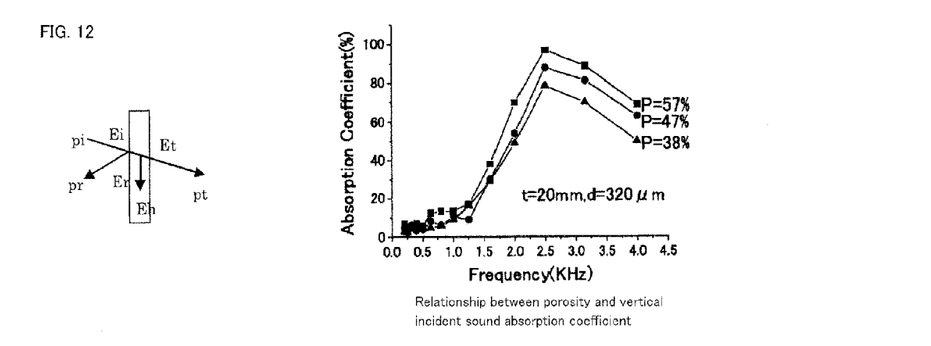
FIG. 12 is an auxiliary explanatory view of an amount of sound energy passing behind the sound transmission material.

A sound energy reflection coefficient $|r^2|$ represents a minimum value, $|r^2|=0$, when a normal acoustic impedance $Z_n$ of a material surface is equal to $\rho c$ ($\rho c$ is a characteristic impedance of air) or a characteristic acoustic impedance $\zeta$ (a value obtained by dividing $Z_n$ by $\rho c$)≡$Z_n/(\rho c)$=1. All the incident sound energy enters inside the material, and a sound absorption coefficient $\alpha=1-|r^2|$ is apparently the maximum value of 1 ("Fundamentals on Sound Absorption" written by Masaru Koyasu, Acoustic technique No. 71/September 1990). The condition of $Z_n=\rho c$ means that the conditions of the material are equal to those of air, and the larger the amount of air contained in the material, that is, porosity (the amount of air contained in the material relative to the apparent volume of the material, and the specific definition is to be described later), the larger the amount of the incident sound energy entering inside the material. Accordingly, when the conditions of the inside of the material, such as flow resistivity (flow resistance per unit thickness) and tortuosity (tortuosity factor) ("Acoustic Materials (part 3)" written by Hiroshi Nakagawa, Nittobo Engineering Technology News), are equal, energy Eh absorbed into the material also becomes constant. Accordingly, as the porosity becomes larger, an amount of sound energy passing behind the material, that is, a transmissivity τ ($\tau=|t|^2$=Et/Ei; the ratio of the transmission energy Et relative to the incidence energy Ei, and t is a sound pressure transmissivity) can be increased to maximum (τ≈1). That is, insertion loss (level difference (dB) between absence and presence of a sample) can be reduced to minimum when the sound transmission material is installed in immediately front of a speaker or a microphone, and it has only be found that the conditions close to the whole sound transmission property can be realized (see FIG. 12).

The present inventor has found that in a material having a self-standing property, in order to obtain a sufficient sound transmission property, not only the porosity of a material in use but also a relationship between the porosity and the thickness of the material are important. The present inventor has further found that a material having a high porosity and a thickness not more than a predetermined value exhibits a sufficiently high sound transmission property.

Namely, the present invention (1) provides a sound transmission material formed by entangling fibers with each other, and the sound transmission material is characterized in that the TABER™ stiffness is not less than 5 mN×m, the bending resistance is not less than 100 mN, the porosity is not less than 50%, and the thickness is not more than 3 mm.

The present invention (2) provides the sound transmission material according to the invention (1), wherein the fibers are metal fibers.

The present invention (3) provides the sound transmission material according to the invention (1) or (2), wherein an insertion loss is not more than 5 dB in each of 1/1 octave bands between 63 Hz and 8 kHz.

The present invention (4) provides the sound transmission material according to any one of the inventions (1) to (3), which is a material obtained by compression molding the metal fibers.

The present invention (5) provides a sound control plane structure (for example, a sound control plane structure 1 of FIG. 1) including the sound transmission material (for example, a sound transmission material 2 of FIG. 1) according to any one of the inventions (1) to (4) and a sound control mechanism (for example, a sound control mechanism 3 of FIG. 1) installed behind a back surface of the sound transmission material and having a sound absorbing structure and/or a reflectivity structure.

The present invention (6) provides the sound control plane structure according to the invention (5), wherein the sound control mechanism is a variable sound control mechanism which can change the placement ratio of the sound absorbing structure and/or the reflectivity structure.

The present invention (7) provides the sound control plane structure (for example, a reverberation variable wall 600) according to the invention (6), which is a sound control plane structure in an interior of a wall surface and/or a ceiling of a building, and the sound transmission material (for example, a sound transmission material 2 of FIG. 3) is disposed so that a space is formed between the sound transmission material and the wall surface and/or the ceiling of the building, the variable sound control mechanism (for example, a variable sound control mechanism 610) has a curtain or a sound absorbing blind (for example, a curtain 613) disposed in the space and configured to be openable and closable, and sound absorption characteristics of a plane is controlled by opening and closing the curtain or the blind.

The present invention (8) provides the sound control plane structure according to the invention (5) (for example, a reverberation control wall 700), which is a sound control plane structure in an interior of a wall surface and/or a ceiling of a building, and the sound transmission material (for example, a sound transmission material 2 of FIG. 4) is disposed so that a space is formed between the sound transmission material and the wall surface and/or the ceiling of the building, and the sound control mechanism has a sound absorbing structure and/or a reflectivity structure (for example, a sound absorbing material 701, an air space 702, a plywood 704, and a space A) disposed in the space.

The present invention (9) provides an interior structure of a building which has the sound control plane structure according to any one of the inventions (5) to (8).

The present invention (10) provides a windscreen for a microphone for reducing wind noise in a microphone having a sound transmission material disposed at a position in which wind to the microphone is blocked, and the sound transmission material is the sound transmission material according to any one of the inventions (1) to (4).

The present invention (11) provides a protective grille disposed on a front surface of a microphone or a speaker, wherein the grille is constituted of the sound transmission material according to any one of the inventions (1) to (4).

The present invention (12) provides a sound transmission projection screen, which has a frontal-projection-type projection surface and is used while having a configuration in which a speaker is disposed behind the projection surface and a sound is produced from the speaker, wherein at lease the projection surface is constituted of the sound transmission material according to any one of the inventions (1) to (4).

The present invention (13) provides a speaker having a speaker box and a woofer unit, wherein the speaker is characterized in that the speaker box includes a sound absorbing structure, which has the sound transmission material according to any one of the inventions (1) to (4), a sound absorbing material formed, of a porous sound absorbing material disposed behind the sound, transmission material; and wherein an air space disposed behind the sound absorbing material and that the sound absorbing structure is provided in an inner wall of the speaker box.

The present invention (14) provides the speaker according to the invention (13) which is of a sound-isolating type.

According to the sound transmission material according to the present invention, the TABER™ stiffness is not less than 5 mN×m, the bending resistance is not less than 100 mN, the porosity is not less than 50%, and the thickness is not more than 3 mm, whereby the material having self-standing property and a high-performance sound transmission property is obtained.

DETAILED DESCRIPTION OF THE INVENTION

The present invention provides a sound transmission material formed by entangling fibers with each other. Namely, in the sound transmission material according to the present invention, the TABER™ stiffness is not less than 5 mN×m, and the bending resistance is not less than 100 mN. When the values are within those ranges, the sound transmission material has a self-standing property. In the sound transmission material having the self-standing property, the porosity is set to not less than 50%, and the thickness is set to not more than 3 mm, whereby a material having a high sound transmission property is obtained.

The TABER™ stiffness of the sound transmission material according to the present invention is not less than 5 mN×m, preferably not less than 8 mN×m, and more preferably not less than 10 mN×m. Although the upper limit of the TABER™ stiffness is not specified, it is 100 mN×m, for example. When the sound transmission material has the TABER™ stiffness within the above range, a material having the self-standing property is obtained. The TABER™ stiffness is measured in accordance with JIS-P8125. The value of the TABER™ stiffness can be adjusted by the hardness of used fibers, the density of the sound transmission material, and the pressure in compression molding, based on the knowledge of those skilled in the art.

The bending resistance of the sound transmission material according to the present invention is not less than 100 mN, preferably not less than 150 mN, and more preferably not less than 200 mN. Although the upper limit of the bending resistance is not specified, it is 2000 mN, for example. When the sound transmission material has the TABER™ stiffness within the above range, a material having self-standing property is obtained. The value of the bending resistance is obtained by measurement in accordance with the TABER™ stiffness test according to JIS-P8125. The value of the bending resistance can be adjusted by the hardness of used fibers, the density of the sound transmission material, and the pressure in compression molding, based on the knowledge of those skilled in the art.

The porosity of the sound transmission material according to the present invention is not less than 50%, preferably 60 to 90%, and more preferably 70 to 90%, Although the upper limit of the porosity is not specified, it is 95%, for example. In the material formed by entangling fibers, a material whose porosity is included, within the range is selected, whereby the effect of securing the sound transmission property while having the self-standing property is provided. Since the porosity is not too high in the preferable range and the more preferable range, it is possible to prevent the opposite side from being seen through the sound transmission material even though the sound transmission material is used as a wall material.

Considering angular dependency of sound transmission, it is very preferable that the porosity of the sound transmission material is 80 to 90%. When the porosity is included in such a range, a high sound transmission property which hardly depends on an incident angle of sound to a material can be exercised.

The porosity is calculated from the volume and the weight of the sound transmission material and the specific gravity of a fiber material at a rate of a space, in which fiber is not present, with respect to the volume of the sound transmission material.

Porosity (%)=(1−weight of sound transmission material/(volume of sound transmission material× specific gravity of fiber))×100

The value of the porosity can be adjusted by the thickness and amount of fibers in use, the density of the material in which fibers are entangled with each other, and the pressure in compression molding, based on the knowledge of those skilled in the art.

The thickness of the sound transmission material is not more than 3 mm, preferably 50 µm to 2000 µm, more preferably 100 µm to 1500 µm, and particularly preferably 500 µm to 1000 µm. When the material having the above porosity has the thickness within the relevant range, a material having a high sound transmission property is obtained.

The sound transmission material according to the present invention is formed by entangling fibers with each other. The fibers used in the sound transmission material include metal fibers and fluorine fibers. Among them, metal fibers are used to secure the self-standing property more easily.

Although the metal fibers are not particularly limited, the fibers can be a kind selected from fibers using, as a material, a metal material such as stainless, aluminum, brass, copper, titanium, nickel, gold, platinum, and lead, or a combination of two or more kinds thereof.

It is preferable to select the fluorine fibers from thermoplastic fluororesins, such as polytetrafluoroethylene (PTFE), tetrafluoroethylene (TFE), perfluoroether (PFE), a copolymer of tetrafluoroethylene and hexafluoropropylene (FEP), a copolymer of tetrafluoroethylene and ethylene or propylene (ETFE), a polyvinylidene fluoride resin (PVDF), a polychlorotrifluoroethylene resin (PCTFE), and polyvinyl fluoride resin (PVP).

Although the diameter of the fibers used in the sound transmission material according to the present invention is not particularly limited, it is, for example, preferably 0.1 to 100 urn, more preferably 0.5 to 50 µm, and still more preferably 1 to 40 µm. When the fiber diameter is included in such a range, the strength of the fiber can be increased, and at the same time, an appropriate sound transmission property is easily obtained.

The sound transmission material is obtained by a method of compression molding the fibers or by paper-making using a raw material configured by containing fibers by a wet paper-making method.

When the sound transmission material according to the present invention is produced by the compression molding, using the metal fibers or the fluorine fibers, the fibers are first bundled, e.g., to be preliminarily compressed, and, thus, to form a web. Alternatively, a binder may be impregnated between fibers to add a binding between the fibers. Although such a binder is not particularly limited, in addition to an organic binder such as an acrylic-based adhesive, an epoxide-based adhesive, and an urethane-based adhesive, an inorganic adhesive such as colloidal silica, liquid glass, and silicate soda may be used. Instead of impregnation with the binder, a fiber surface is previously coated with a heat adhesive resin, and an aggregation of metal fibers may be stacked, and then heated and adhered. The amount of impregnation of the binder is preferably 5 to 130 g with respect to a sheet surface weight of 1000 g/m$^2$, and more preferably 20 to 70 g.

The aggregation of the metal fibers is pressurized while being heated, thereby a sheet is formed. Although the heating conditions are set considering the drying temperatures and curing temperatures of the binder in use and the heat adhesive resin, the heating temperature is usually approximately 50 to 1000° C. The pressure to be added is adjusted considering the elasticity of fibers, the thickness of the sound transmission material, and the light transmittance of the sound transmission material. When the fibers are impregnated with the binder by spraying, it is preferable that a metal fiber layer is formed to have a predetermined thickness by press working and so on before the spray treatment.

In the sound transmission material using the metal fibers, with using slurry configured by including metal fibers, a sheet can be formed by a wet papermaking method. When the slurry including the metal fibers is produced, the dispersibility of the metal fibers in water may be deteriorated, and therefore, a small amount of a polymer aqueous solution having a thickening effect, such as polyvinylpyrrolidone, polyvinyl alcohol, and carboxymethyl cellulose (CMC), maybe added. As the papermaking method, various methods including, for example, fourdrinier papermaking, cylinder mold papermaking, and inclined wire type papermaking can be employee as necessary.

When the wet papermaking method is used, it is preferable to produce the sound transmission material through a fiber entanglement treatment process of entangling the metal fibers, constituting a moisture-containing sheet on a net, with each other. As the fiber entanglement treatment process, it is preferable to employ, for example, a fiber entanglement treatment process of jetting a high-pressure water let against a metal fiber sheet surface after the papermaking. More specifically, a plurality of nozzles are arranged in a direction perpendicular to a sheet flow direction, and the high-pressure water jets are simultaneously jetted from the nozzles, whereby the metal fibers can be entangled with each other throughout the sheet.

It is preferable that a method for producing a metal fiber material includes, after the wet papermaking process described above, a sintering process of sintering the obtained metal fiber material in vacuum or in a non-oxidative atmosphere at a temperature nor more than the melting point of the metal fibers. Since the metal fibers entangle with each other, the strength of the sintered metal fiber material can be enhanced.

In the method for producing a sound transmission material by using fluorine fibers, the fluorine fibers and a material having a self-adhesive function are mixed by the wet papermaking method and dried to obtain a fluorine fiber mixed paper material. The fluorine fiber mixed paper material is thermally compressed at a temperature of not less than a softening point of the fluorine fiber to heat seal between fibers of the fluorine fiber. Thereafter, the material having a self-adhesive function is dissolved and removed by a solvent and dried again if necessary, whereby the sound transmission material can be produced. As the material having a self-adhesive function, there may be used natural pulp made from a plant fiber such as wood, cotton, hemp, and straw usually used in the manufacture of paper, synthetic pulp and synthetic fiber made from polyvinyl alcohol (PVA), polyester, aromatic polyamide, and acrylic or polyolefin thermoplastic synthetic polymer, and a paper strengthening agent for papermaking made from natural polymer or synthetic polymer. The material is not limited to them as long as it has a self-adhesive function, is mixed with fluorine fiber, and can be dispersed in water.

(Physical Properties)
Sound Transmission Property

It is preferable that the sound transmission material according to the present invention has a property that a difference of frequency characteristics (hereinafter referred to as "insertion loss") measured in accordance with the following measuring method 1 is within 5 dB (preferably within 2 dB) in each of 1/1 octave bands of a center frequency of 63 Hz to 8 kHz. A preferable sound transmission material is of within 6 dB (preferably within 3 dB) in each of ⅓ octave bands of a center frequency of 31.5 Hz to 16 kHz. When a continuous sine wave sweep is used, this case follows the case of the evaluation in the ⅓ octave band.

As the method of evaluating the sound transmission property, various methods are assumed. More specifically, a microphone and a speaker are installed in an anechoic room or a highly sound absorbent room so as to face each other so that the microphone is in a direct sound field (an area close to a sound source where direct sound is sufficiently larger than an indirect sound (reflected sound and reverberant sound) with respect to the speaker, and when the sample is placed between the microphone and the speaker at right angle to a reference line (connecting the microphone and the speaker) and when the sample is not placed, a level difference (dB) of the response of the microphone to the speaker is evaluated as the insertion loss (dB). A signal generated from the speaker may be any of a sine wave, pink noise, and warble tone (FM sound), and the duration time may be any of a continuous sound and a short sound. Further, a filter for band limitation maybe provided on either a sound source side or a sound receiving side, or either a short sound or a continuous frequency sweep sound may be used. Furthermore, the sample may be positioned any one of, in immediately front of the speaker, in immediately front of the microphone, or at an intermediate position between the speaker and the microphone, and these cases have a property that substantially the same results are obtained as long as a system of measurement is regarded as a linear system. In this example, it is specified that the sample is placed at right angle to the reference line to perform evaluation; however, the sample is installed at an angle to the reference line according to need, and the angular dependence may be evaluated. When the results are different depending on the measuring method, in the sound transmission property in the specification, the results obtained by the following measuring method 1 are given preference.

Figure 7:
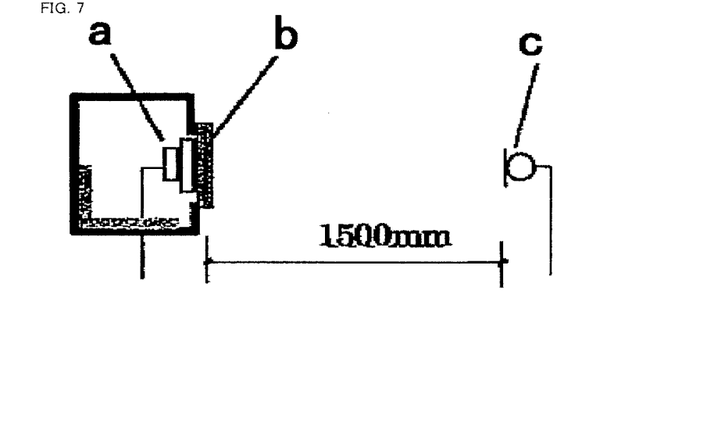
FIG. 7 is a view showing an outline of an insertion loss Δ (dB) measurement method used for evaluating a sound transmission property in a measurement method 1.

Measuring method 1: as a method of most easily measuring the insertion loss, in an anechoic room or a highly sound absorbent room corresponding thereto, the angle θ formed by an axis connecting a speaker and a microphone (hereinafter referred to as a "speaker-microphone axis") and a normal direction of the sound transmission material equals to 0° (the state shown in FIG. 7 is the angle θ=zero), and a continuous sine wave sweep sound from 20 Hz to 20 kHz (sound of not less than 20 dB in S/N ratio with respect to background noise) is emitted and then received by the microphone, a sound level meter, or the like installed at a position offset from the speaker at a distance of several tens of centimeters to several meters (preferably approximately 30 cm to 5 m). Thereafter, a difference between the frequency response characteristics at the time when the sound is recorded in a level recorder or the like and the frequency response characteristics at the time when the relevant member is installed in immediately front of the speaker or the microphone or at an intermediate position between them is measured, and the difference is regarded as the insertion loss Δ (dB).

When the sound transmission material according to the present invention is evaluated by the insertion loss measured in accordance with the following measuring method 2, the dependency of the incident angle of a sound can be evaluated.

Figure 8:
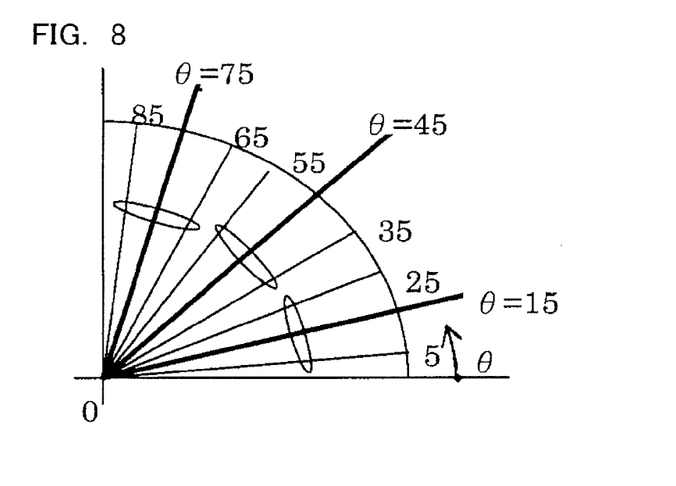
FIG. 8 is an auxiliary explanatory view of a measurement method 2.

Measuring method 2: the angle formed by the speaker-microphone axis and the normal direction of the sound transmission material is θ (the state shown in FIG. 7 is the angle θ=zero), and the insertion loss Δ (dB) can be measured at each arbitrary angle θ between 0 to 90 degrees, or an energy average (power average) of n insertion losses included in adjacent ±Δθ for each representative angle θi may be defined as an average insertion loss Δ (–)i (dB) at each of the representative angles θi (FIG. 8). Accordingly, the dependency of the insertion loss according to the angle can be evaluated. For example, when the energy average (power average) of three angles for each adjacent ±10 degrees when i=15 degrees, 45 degrees, and 75 degrees is calculated, the energy mean value can be obtained by the following formulae (a) to (c) or (d) to (f).

[FORMULA 2]

$$\Delta_{15}(dB) = 10\log\{[10^{(-\Delta_5/10)} + 10^{(-\Delta_{10}/10)} + 10^{(-\Delta_{25}/10)}]/3\} \quad (a)$$

$$\Delta_{45}(dB) = 10\log\{[10^{(-\Delta_{35}/10)} + 10^{(-\Delta_{45}/10)} + 10^{(-\Delta_{55}/10)}]/3\} \quad (b)$$

$$\Delta_{75}(dB) = 10\log\{[10^{(-\Delta_{65}/10)} + 10^{(-\Delta_{75}/10)} + 10^{(-\Delta_{85}/10)}]/3\} \quad (c)$$

[FORMULA 3]

$$\Delta_{15}(dB) = 10\log\{[10^{(L'_5/10)} + 10^{(L'_{15}/10)} + 10^{(L'_{25}/10)}/3\} - 10\log\{[10^{(L_5/10)} + 10^{(L_{15}/10)} + 10^{(L_{25}/10)}]/3\} \quad (d)$$

$$\Delta_{45}(dB) = 10\log\{[10^{(L'_{35}/10)} + 10^{(L'_{45}/10)} + 10^{(L'_{55}/10)}]/3\} - 10\log\{[10^{(L_{35}/10)} + 10^{(L_{45}/10)} + 10^{(L_{55}/10)}]/3\} \quad (e)$$

$$\Delta_{75}(dB) = 10\log\{[10^{(L'_{65}/10)} + 10^{(L'_{75}/10)} + 10^{(L'_{85}/10)}]/3]\} - 10\log\{[10^{(L_{65}/10)} + 10^{(L_{75}/10)} + 10^{(L_{85}/10)}]/3\} \quad (f)$$

(In the above formulae (e) and (f), $L'_5$, $L_5$ and so on are a frequency responses (dB) of the microphone when the relevant member is installed when θ=5 degrees, and the frequency response before the installation.) In this example, since the evaluation can be performed from various angles, the measuring method is suitably used, in the evaluation of the material according to the present invention.

Wind Noise Reduction Effect

In a windscreen according to the present invention, in a wind noise reduction effect evaluation method, it is preferable that the wind noise reduction effect, of not less than Δ20 dBA in the 1/1 octave band is obtained with respect to wind having a wind speed of 2.7 m/s. In the wind noise red-action effect evaluation test, wind with speed of 2.7 m/s (in a range in which generation of the wind noise is confirmed or the reduction of the wind noise can be observed) is sent from a blower or the like in an anechoic room. When the response measured in such a state that a microphone is mounted with the windscreen is reduced by S (dBA) at a noise level (dBA) relative to a microphone output response observed without mounting the windscreen, the wind noise reduction effect is Δs (dBA).

(Sound Control Plane Structure Used, in Inner Wall of Building)

Figure 1A:
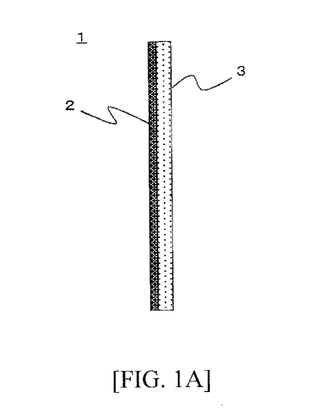
FIG. 1A is a cross-sectional view of a sound control plane structure of the present invention.
Figure 1B:
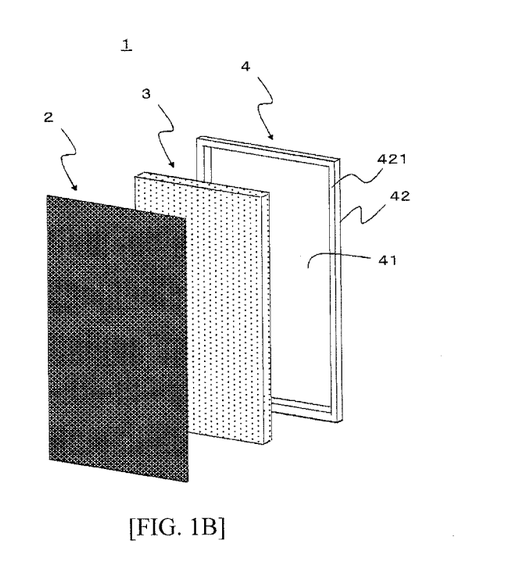
FIG. 1B is an exploded view of the sound control plane structure of the present invention.

FIG. 1 is a schematic configuration diagram of a sound control plane structure according to the present invention. FIG. 1A is a cross-sectional view of the sound control plane structure according to the present invention, and FIG. 1B is an exploded view of the sound control plane structure according to the present invention. A sound control plane structure 1 according to the present invention has the above sound transmission material 2 formed into a plate shape and used as a decorative plate, and a sound control mechanism 3 disposed behind the sound transmission material and having a sound absorbing structure and/or a reflectivity structure. Using the sound transmission material according to the present invention as the decorative plate of the sound control plane structure provides not only the sound transmission property but also a texture equivalent to a rigid imperforate plate because of the self-standing property of the material itself, achieving an effect of a so-called "hard (sound) absorbing material", Therefore, it can be applied to, for example, wall surfaces of an art museum to create a silent and tranquil space. As may be necessary, a material or a structure which does nor affect the sound transmission property, for example, a honeycomb structure and metal mesh such as expand metal, may be provided behind the sound transmission material to reinforce the material.

The sound absorbing structure in the sound control mechanism 3 can be realized by, for example, disposing the sound absorbing material. As the sound absorbing material, well-known materials may be used and, for example, glass wool, needle felt, urethane foam, sponge, rock wool board, and so on may be used. The sound absorbing structure may have the sound absorbing material and an air space disposed behind the sound absorbing material. By virtue of the provision of the air space, a sound absorbing power can be extended to low frequencies.

The reflectivity structure in the sound control mechanism 3 can be realized by, for example, disposing nothing or disposing a reflector. As the reflector, well-known materials can be used and, for example, a plate with no hole such as a plywood, a gypsum plate, a concrete plate, and a flexible board may be used.

It is preferable that, in order to support the above sound control plane structures, the structures further have a framework 4 including a space 41 containing the sound control mechanism 3 and a pillar 42 formed with a fixing surface 421 for fixing the sound transmission material 2 (FIG. 1B). By virtue of the panelization, a room in which a sound anomaly such as flutter echo occurs can be easily retrofitted with the sound transmission material, and the sound anomaly can be eliminated.

When the framework 4 is provided, the sound control plane structure 1 has the framework 4, the sound control mechanism 3 stored in a space 41 of the framework 4, and the sound transmission material 2 mounted on the fixing surface 421 of the pillar 42 of the framework. The entire framework 4 may be reinforced by providing furring strips 43 and an intermediate post 44 at an intermediate position if necessary (see, FIG. 2). In this case, same as the above, an air space may be suitably provided behind the sound absorbing material.

As the effect of the sound control plane structure according to the present invention, a sound reaches the sound control plane structure according to the present invention, transmits through the sound transmission material, and reaches the sound absorbing structure to be absorbed thereinto, or reaches the reflectivity structure to be reflected thereby. In this case, by virtue of the use of the sound transmission material according to the present invention, it is possible to prevent the sound from being bounced on a wall surface, and therefore, the acoustic characteristics of an object disposed behind the sound transmission material are easily reflected. Consequently, it can be effectively utilized as a sound improvement panel which can easily resolve a sound anomaly in, for example, a conference room of an office building and as a sound field control panel in an audio room, an AV room and so on in housing.

When the sound control plane structure 1 according to the present invention is used as an interior structure of a building, for example, a novel "hard sound absorbing surface" is provided, and a space requiring a flat and hard interior surface can be effectively subjected to sound absorbing treatment.

Figure 2:
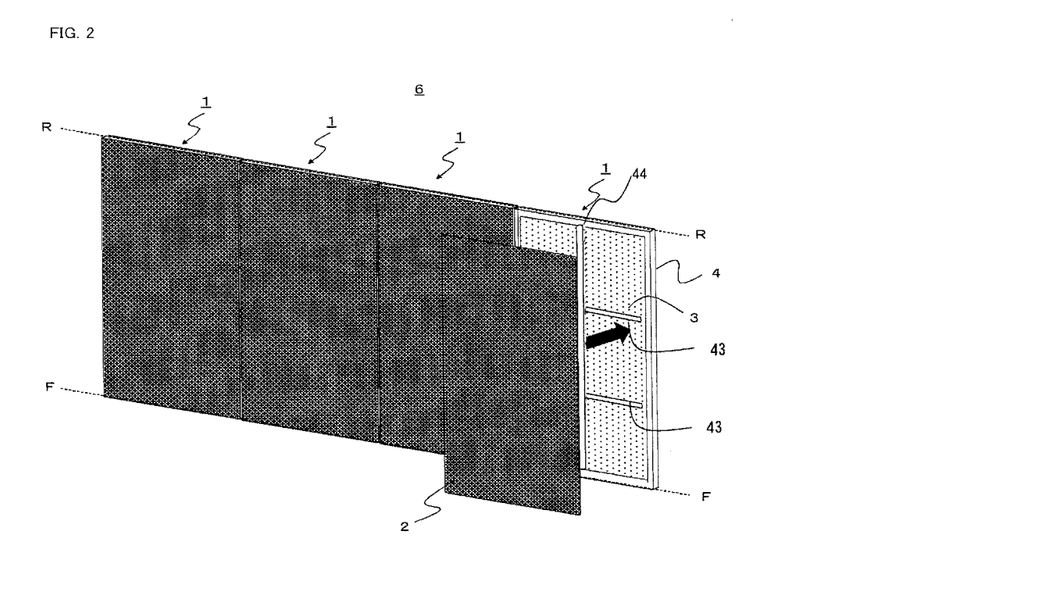
FIG. 2 is a schematic configuration diagram showing a case in which the sound control plane structure is used in an architectural interior.

FIG. 2 is a view showing a schematic configuration of an interior structure of a building using the sound control plane structures 1 according to the present invention. An interior structure 6 has a structure in which the sound control plane structures 1 are arranged horizontally, and the furring strips 43 and the intermediate post 44 may be provided midway if necessary, whereby the entire structure may be reinforced, or an air space is provided behind the sound absorbing material as described above, whereby the sound absorbing power may be extended to a low-pitched sound range.

The interior structure 6 can constitute a wall surface, for example, and the height of the sound control plane structure 1 may be a distance from a floor end F of a wall surface to a ceiling end R. By virtue of the use of the sound transmission material according to the present invention, even when the size of surfaces thus continuously formed increases, the construction work is easily carried out because the sound transmission material has the self-standing property, and after the construction work, wrinkles and sagging are less likely to be formed.

As might be expected, the surfaces of the sound control plane structure may be continued. The total sound absorbing power in a room is adjusted by arranging surfaces having a reflectivity structure which has, at the intermediate portion, exactly the same surfaces using the sound transmission material according to the present invention and does not have a sound absorbing material therebehind (see, FIG. 9(0)), or a reflectivity structure in which a material such as a plywood and a gypsum plate is placed behind the sound transmission material according to the present invention as a surface decorative material, whereby optimum reverberation characteristics corresponding to the use of a room can be provided without changing interior design at all.

Figure 3:
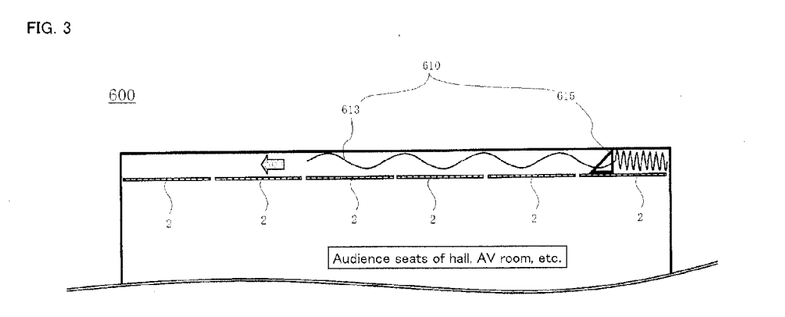
FIG. 3 is a schematic configuration diagram of a reverberation variable wall 600 whose appearance does not change.

The sound absorbing material behind the interior structure 6 is omitted, and as shown in FIG. 3, the interior structure 6 is constituted only of a surface material, that is, the sound transmission material according to the present invention. A variable sound absorbing mechanism such as a curtain and a sound absorbing blind (sound absorbing louver) is provided behind the interior structure 6, and a reverberation variable wall and a reverberation variable ceiling are configured without changing interior design at all, whereby indoor reverberation characteristics may be changed freely. Since indoor design is not changed, a feeling of strangeness is not given to persons staying in a room and audience/performers (in the case of a hall), and thus this constitution is really suitable as means of varying the sound effect.

More specifically, FIG. 3 shows a reverberation variable wall 600 as an application example of the sound control plane structure utilizing the sound transmission material according to the present invention as the surface material. FIG. 3 shows an example of a reverberation variable wall intended to be utilized in a hall, an AV room in housing, a recording studio, a music rehearsal room, and so on. Since the sound transmission material according to the present invention is used as a surface member, the sound absorbing power of a wall surface and a ceiling surface is changed by operating a back variable sound control mechanism without changing design of a surface, and the reverberation time characteristics of a room can be changed. The relevant structure provides the effect that the surface design is not changed although the acoustic conditions are changed.

More specifically, FIG. 3 shows a schematic configuration diagram of the reverberation variable wall 600 and is a cross-sectional view of the reverberation variable wall 600 as viewed from the upper viewpoint of a room. The reverberation variable wall 600 has the sound transmission material 2 provided over a wall surface and the variable sound control mechanism 610 disposed behind the sound transmission material.

The variable sound control mechanism 610 has, for example, a curtain 613 attached to a curtain rail provided on a ceiling portion of a space behind the sound transmission material 2 and having a sound absorbing property and a curtain box 615 storing the curtain. The curtain 613 may have an opening and closing mechanism which can electrically open and close the curtain 613.

In the variable sound control mechanism 610, she curtain 613 disposed behind the sound transmission material is opened and closed, whereby the acoustic characteristics of the wall surface can be changed. Namely, although the appearance of the wall surface does not change owing to the presence of the sound transmission material, the area occupied by a sound absorbing material is changed by opening and closing the curtain, and therefore, the acoustic characteristics of the reverberation variable wall 600 change. In other words, in the prior art, in order to change the acoustic characteristics, a sound absorbing material and a reflecting material should be installed, so that the appearance is significantly changed. However, in the present invention, the acoustic characteristics can be changed without changing the appearance. The reverberation variable wall 600 exerts an especially high effect in a space restricted by design of the appearance, such as a concert hall and a movie theater.

Figure 4:
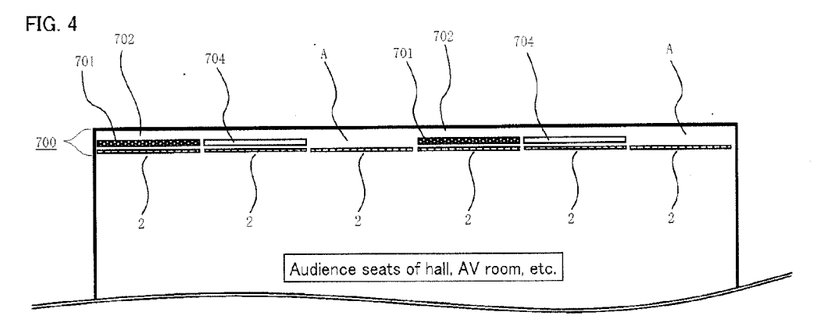
FIG. 4 is a schematic configuration diagram of a reverberation control wall 700 whose appearance does not change.

As an application example of the sound control plane structure utilizing the sound transmission material according to the present invention as the surface material, a reverberation control wall is shown. FIG. 4 is a schematic configuration diagram of a reverberation control wall 700 according to the present invention. According to this constitution, surfaces from a perfect reflective surface to a perfect sound absorbing surface can be provided while the design of the surfaces remains standardized.

The reverberation control wall 700 has the sound, transmission materials 2 arranged in front of a wall to form a space and the sound absorbing structure and/or the reflectivity structure provided in the space formed behind the sound transmission materials. For example, when the sound absorbing structure constituted of a sound absorbing material 701 and an air space 702 is provided behind the sound transmission materials 2, a sound absorbing surface can be formed. Meanwhile, when the reflectivity structure constituted of a plywood 704 is provided behind the sound transmission materials 2, a strong reflective surface can be formed. Alternatively, a space A (back material is omitted) as the reflectivity structure is provided behind the sound transmission materials 2, whereby a weak reflective surface can be formed. A material behind the sound, transmission material is thus selected, whereby universal sound absorption characteristics can be realized without considering design characteristics. Although the air space may not be provided behind the sound absorbing surface, the provision of the air space can extend the sound absorbing power of a sound absorbing surface to a lower frequency range.

(Windscreen for Microphone)

Since the sound transmission material according to the present invention effectively blocks wind corresponding to direct current components of an electrical signal due to its special structure and has a function like a high-pass filter which passes an acoustic signal corresponding to an AC signal without loss according to its gist, a windscreen for a microphone can be effectively configured. The configuration of the windscreen for a microphone is not particularly limited as long as it blocks wind to a microphone. In the sound transmission material according to the present invention, when the TABER™ stiffness, the bending resistance, the porosity, and the thickness are within a predetermined range, the self-standing property and the sound transmission property can be realized simultaneously, whereby the wind noise can be effectively reduced. Moreover, since the sound transmission material has the self-standing property, the sound transmission material according to the present invention is provided not on a surface of a conventional infilled type windscreen (formed of sponge or urethane) but on a surface of a windscreen in the form of, for example, a spherical shape, a rectangular shape, a conical shape, a spherical segment body shape, or a streamline shape, whereby a windscreen having a hollow structure can be configured.

Figure 5A:
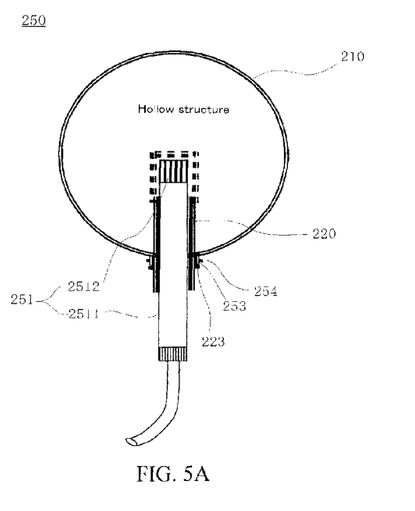
FIG. 5 is a schematic configuration diagram of a spherical windscreen (for a field-type microphone) using a sound transmission material.
Figure 5B:
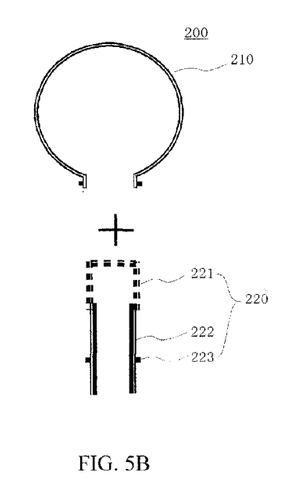

FIG. 5 shows a schematic configuration diagram of a windscreen 200 having a hollow structure. The windscreen 200 having a hollow structure has a screen unit 210 constituted of the sound transmission material according to the present invention and a waterproof protecting cap 220. The windscreen 200 is configured by thus combining the screen unit 210 and the waterproof protecting cap 220 (FIG. 5B). The windscreen 200 is thus configured and used after a microphone is inserted into the waterproof protecting cap 220.

The waterproof protecting cap 220 is constituted of a tip cap 221 covering a sound collecting unit of a microphone constituted of the sound transmission material according to the present invention and a hard cylindrical material such as a metal tube and has a body cap 222 attached firmly to a body of the microphone. A circular flange 223 for determining the position of the screen unit 210 may be provided around the body cap 222.

A microphone device 250 using the windscreen has a microphone 251 having a cylindrical body 2511 and a sound collecting unit 2512 provided at the front end of the body, the waterproof protecting cap 220 covering the microphone, the screen unit 210 having the hollow structure and covering at least the sound collecting unit 2512, an airtight rubber packing 253 providing airtightness to the screen unit 210 and the inside of the screen, and a metal plate 254 fixing the screen unit 210 and the waterproof protecting cap 220 through the rubber packing (FIG. 5A).

When the sound transmission material according to the present invention is used, a hollow type windscreen utilizing the self-standing property can be configured as described above, and therefore, it is particularly preferable to use the windscreen as a windscreen for a microphone for surface sound pressure measurement. By virtue of the use of the sound transmission material according to the present invention, intrusion of wind can be effectively reduced or blocked without any flap or resonance of a wind protection layer on a surface even under strong wind having a high wind speed, and therefore, it is most preferable to configure, in particular, a low-frequency windscreen and a windscreen used under strong wind.

(Microphone Device for Surface Sound Pressure Measurement with Cylindrical Windscreen)

Figures 6, 6A, 6B:
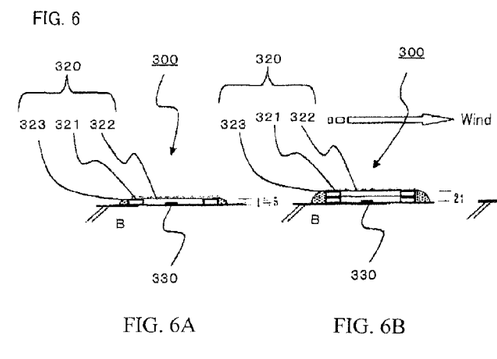
FIG. 6 is a schematic configuration diagram of a microphone device for surface sound pressure measurement with a cylindrical windscreen.

FIG. 6 is a schematic configuration of a microphone device 300 for surface sound pressure measurement with a cylindrical windscreen according to the present invention. The microphone device 300 for surface sound pressure measurement according to the present invention has a windscreen 320 including a frame body 321 and a sound transmission material 322 formed on an upper surface of the frame body, and a microphone 330 provided inside the windscreen. A streamline edge 323 may be provided at an outer edge of the frame body 321 in order to flow wind smoothly. Although the shape of the frame body 321 is not particularly limited, the frame body may have a cylindrical shape, for example. Although the height h of the frame body 321 is not particularly limited, previous studies ("Development of waterproof windscreen for low-frequency sound measurement" written by Fukushi Kawakami, Susumu Inamoto, Shinichi Terazono, Yasuo Inone, and Takayuki Sano, Proceedings of Meeting of the Acoustical Society of Japan, 2011, 03, p. 36, (1-12-23)) have shown that there is an optimum balance in a diameter d of a circle (in the case of a spherical segment body) and a cylinder, and that when the height h=10 mm, it is optimum that d≈approximately 70 mm. When the windscreen effect is required to be extended to low frequencies, unless there are other particular reasons, it is preferable that the effect is increased, so that d and h are doubled per 1 octave (the effect is extended to the low frequency band) while maintaining this basic balance (height h: diameter d=1:7).

Figure 6C:
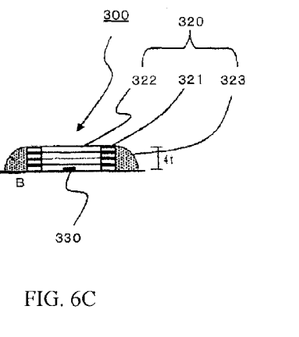

In common use, the height h of a cube is preferably within a range of 1 mm to several 10 mm, more preferably within a range of 1 mm to 50 mm, and still more preferably within a range of 10 mm to 30 mm. When the height h is less than 1 mm, the wind noise reduction effect cannot be satisfactorily obtained, and thus it is not preferable. When the height h is more than several 10 cm, new wind noise is generated around the windscreen due to a turbulent air flow, or a path difference (difference of a distance from a sound source to a sound receiving point between when there is a barrier and when, there is no barrier) in a so-called barrier effect (sound barrier effect) occurs, and the insertion loss is enlarged or varies according to a sound source position, that is, the incident angle, so that directional characteristics are generated, for example, and thus it is not preferable. Thus, it is preferable that the cross section of the peripheral portion is formed into a streamline shape like the frame body 323 of FIG. 6 by caulking processing from an infilled, type gradient material such as clay having a cross section of a right triangle or a ¼ circle. When this measure is taken, it is confirmed that particularly the height of the frame body is set to approximately 10 mm or more, whereby a suitable space is formed between the microphone and the windscreen to notably reduce the wind noise. The height can be adjusted by superposing a plurality of the frame bodies 321 according to the present invention (FIGS. 6A to 6C).

It is preferable that the frame body has a cylindrical shape. Although the diameter d of the cylinder is not particularly limited, it is preferable to change the diameter d according to a use application (lower limit frequency for wind noise reduction) while maintaining a substantially similar form according to the height h as described above. In general, the diameter d is preferably not less than 5 mm, more preferably not less than 30 mm, and still more preferably not less than 70 mm, and it is preferable to increase the height h according to the enlargement of the diameter. Although the upper limit of the cylinder diameter is not particularly limited, it is approximately 200 mm, for example.

The surface microphone device 300 according to the present invention is applied to a surface B of a body of an automobile, an airplane, or the like and can measure noise during movement. Moreover, since the microphone device 300 is installed on a duct tube wall surface and can collect duct propagation noise without an influence from wind noise, an effective control effect and a large noise reduction effect can be provided when the microphone device 300 is used in an ANC (active noise control) application and so on.

The sound transmission material according to the present invention can be used as a protective grille disposed on a front surface of a microphone or a speaker. When the sound transmission material is disposed on the front surface of the speaker, the sound transmission material may be used as a decorative plate hiding the speaker, as well as a hole such as a baffleless port formed in a front baffle, and a knob of a variable attenuator.

The sound transmission material according to the present invention can be used as a movie screen by utilizing the sound transmission property and the self-standing property. In this case, it is preferable that a front projection type projection surface is formed of the sound transmission material according to the present invention, and a speaker is disposed behind the sound transmission material and used. Even if the speaker is thus disposed on a back surface of the screen, a sound is not blocked by using the sound transmission material according to the present invention, and the sound is transmitted; therefore, the sound localization performance and articulation is enhanced.

A sound absorbing structure at low frequencies can be established by utilizing the sound transmission material according to the present invention. Namely, the sound absorbing structure has the sound transmission material according to the present invention, a sound absorbing material constituted of a porous sound absorbing material and disposed behind the sound transmission material, and an air space disposed behind the sound absorbing material. Although absorption at low frequencies is difficult in the case of using only a conventional glass wool, such a structure allows sound absorption at low frequencies. Examples of the porous sound absorbing material include glass wool, and urethane foam, and so on.

In a speaker having a speaker box of sound-isolating type or a type corresponding thereto, instead of a sound absorbing material, such as glass wool, in the speaker box contributing only to sound absorption in a middle frequency range in the prior art, a hollow structure using the sound transmission material according to the present invention or a structure in which the hollow structure is filled with a porous sound absorbing material such as glass wool is adopted, whereby the speaker has a large sound absorbing power mainly at low frequencies, and the quality (sound, qualify) and the volume (sound volume) of sound emitted from the front surface can be enhanced. The low frequencies especially means, in a sound range of sound emitted from a speaker, a sound range in which there is a problem that sound (assumed as normal phase sound) emitted from a front surface of a speaker unit (for example, a woofer unit) and sound (assumed as inverted, phase sound) emitted from a back surface of the speaker unit are cancelled with each other due to interference, and more specifically, means the sound range of not more than 500 Hz, for example. At low frequencies, it is said that in a sound-isolating type speaker box, the inverted phase sound emitted from the speaker back surface is emitted to the front surface through components such as a cone of a speaker unit by sound reflection and wrap-around of sound. In this case, the normal phase sound emitted from the speaker unit front surface and the inverted phase sound are mixed and cancelled with each other. When the sound absorbing s true sure according to the present invention is disposed in a speaker box, the inverted phase sound is absorbed, and therefore, the cancellation with the normal phase sound due to interference is prevented, so that the massivensss and quality of sound can be enhanced.

More specifically, in a speaker having a speaker box and a woofer unit, the speaker box includes the sound transmission material according to the present invention, a sound absorbing material constituted of a porous sound absorbing material disposed behind the sound transmission material, and a sound absorbing structure having an air space disposed behind the sound absorbing material. The sound absorbing structure is provided in an inner wall of the speaker box, and the air space, the sound absorbing material, and the sound transmission material are stacked in this order from the inner wall of the speaker.

The sound transmission material according to the present invention can be used in various fields by utilizing its sound transmission property.

EXAMPLES

Example 1

Fibers of stainless AISI316L with a wire diameter of 30 μm are used to be uniformly superposed to form a cotton-like web. The web is weighed to have a basis weight of 950 g/m² and compressed between flat plates so as to have a thickness of 800 μm. The web compressed and formed in to a plate shape is put into a sintering furnace, heated to 1100° C. in a vacuum atmosphere, and sintered, thereby a sample is formed.

Example 2

Fibers of stainless AISI316L with wire diameters of 6.5 and 12 μm are used, and webs are formed using the fibers in the same manner as in the Example 1. The webs are overlapped on opposite sides in a weight ratio of 7:3. The web formed by overlapping the front and back sides is weighed to have a basis weight of 850 g/m² and compressed between flat plates so as to have a thickness of 400 μm. Except for those conditions, a sample is formed by a process similar to that of the Example 1.

Example 3

Copper fibers with a wire diameter of 30 μm are used, and a web is formed as in the Example 1. The web is weighed to have a basis weight of 1100 g/m² and compressed between flat plates so as to have a thickness of 800 μm. The web compressed and formed into a plate shape is put into a sintering furnace, heated to 900° C. in a vacuum atmosphere, and sintered, thereby a sample is formed.

Example 4

Aluminum fibers with a wire diameter of 30 μm are used, and a web is formed in the same manner as in the Example 1. The web is weighed to have a basis weight of 800 g/m² and compressed between flat plates so as to have a thickness of 1000 μm. The web compressed and formed into a plate shape is put into a sintering furnace, heated to 800° C. in a hydrogen atmosphere, and sintered, thereby a sample is formed.

Comparative Example 1

Aluminum is used as a raw material, and fibers with a wire diameter of 100 μm are formed by a melt spinning method. In the case of these fibers, since a cotton-shaped object is formed in the production of the fibers, the cotton-shaped object is weighed to have a basis weight of 1650 g/m² and compressed between rolls so as to have a thickness of 5000 μm, thereby a sample is formed.

Comparative Example 2

Aluminum fibers with a wire diameter of 100 μm are used, and a web is formed in the same manner as in the Example 1. The web is weighed to have a basis weight of 1500 g/m² and compressed between flat plates so as to have a thickness of 1000 μm. The web compressed and formed into a plate shape is put into a sintering furnace, heated to 900° C. in a vacuum atmosphere, and sintered, thereby a sample is formed.

Comparative Example 3

A fluorine fiber sheet "TOMIFLECK F" R-250 (produced by Tomoegawa Paper Co., Ltd.) is used as a sample.

Comparative Example 4

A stainless fiber sheet "TOIFLECK SS" SS8-50M (produced by Tomoegawa Paper Co., Ltd.,) is used as a sample.

lated is used as a signal. The sound in use here is of not less than 20 dB in S/N ratio with respect to background noise. The insertion loss is obtained by the following formula:

Insertion loss Δ (dB)=frequency response (dB) of microphone obtained when there is not sample–frequency response (dB) obtained when sample is placed When the insertion loss Δ (dB) is within 2 dB in each of 1/1 octave bands of a center frequency of 63 Hz to 8 kHz or when

TABLE 1

| Sample name | Kind of fiber | 1 Self-standing property | 2 Taber resistance nM-mN | 3 Bending resistance mN | 6 Thickness μm | 7 Porosity % | 8 Sound transmission property | 9 Wind noise |
|---|---|---|---|---|---|---|---|---|
| Example 1 | TTP F8 | Stainless | Present | 33.0 | 683 | 785 | 84.8 | Good | Excellent |
| Example 2 | TTP F1 | Stainless | Present | 10.8 | 223 | 389 | 72.4 | Good | Excellent |
| Example 3 | TTP C6 | Copper | Present | 28.2 | 558 | 754 | 83.2 | Good | Excellent |
| Example 4 | TTP A8 | Aluminum | Present | 11.9 | 245 | 1120 | 70.5 | Good | Excellent |
| Comparative Example 1 | Aluminum fiber 5t | Aluminum | Present | 2.65 | 54.9 | 5000 | 88.1 | Inferior | Good |
| Comparative Example 2 | Aluminum fiber plate | Aluminum | Present | 50.7 | 1050 | 991 | 37.9 | Inferior | |
| Comparative Example 3 | Fluorine fiber 250 μm | PTFE | Absent | 0.23 | 4.76 | 287 | 70.3 | Good | Good |
| Comparative Example 4 | Stainless fiber 50 μm | Stainless | Absent | 0.31 | 6.31 | 48 | 86.8 | Good | Good |

(Self-Standing Property)

An end of a sample oil a 5 cm square shape is held and the opposite end is lifted to evaluate the sample. When the sample is not bent, it is determined that the self-standing property is "present", and when the sample is bent, it is determined that the self-standing property is "absent".

(TABER™ Stiffness/Bending Resistance)

The TABER™ stiffness and the bending resistance are measured in accordance with the TABER™ r stiffness test (JIS-P8125).

(Thickness)

The thickness is measured by a micrometer.

(Porosity)

The porosity is calculated from the volume of a sample calculated from the outer size, the mass of the entire sample and specific gravity of fibers by the following formula:

Porosity (%)=(1−weight of sound transmission material/(volume of sound transmission material× specific gravity of fiber))×100

(Sound Transmission Property)

Measuring Method 1

The sound transmission property is evaluated based on the measuring method 1 described herein. Regarding transmission frequency characteristics, there are various methods using a continuous sine wave sweep, an FM short sound, stationary state pink noise, FM warble tone, and the like. In this case, as shown in FIG. 7, a continuous sine wave sweep sound is emitted from a sound producing device of about 2250 cm$^3$ to which a speaker a having an effective diameter of a little more than 10 of centimeters is attached, a sound transmission material b of each example and each comparative example is installed on the front surface of the speaker, and an effective value of a sound pressure response measured by a microphone c installed at a position of about 1500 mm from the front surface of the speaker a is regarded as the transmission frequency characteristics and recorded in a level recorder or the like. In this state, changes observed when the sound transmission material b is present and when the sound transmission material b is absent are respectively regarded as the insertion losses Δ (dB), and the insertion losses are measured and confirmed. As a sound source of a sound emitted from the speaker a, in a range from 20 Hz to 20 kHz, a continuous sine wave sweep which is not frequency moduthe insertion loss Δ (dB) is within 3 dB in each of ⅓ octave bands of a center frequency of 31.5 Hz to 16 kHz, the sound transmission property is evaluated as "good". When the insertion loss Δ (dB) is within either 5 dB or 6 dB in each octave band, the sound transmission property is evaluated as "below average". When, the insertion loss Δ (dB) is more than 5 dB and more than 6 dB in each octave band, the sound transmission property is evaluated as "inferior". Since the continuous sine wave sweep is used, the sound transmission property is evaluated in the 1/1 octave bands and the ⅓ octave bands.

Measuring Method 2

Figure 10:
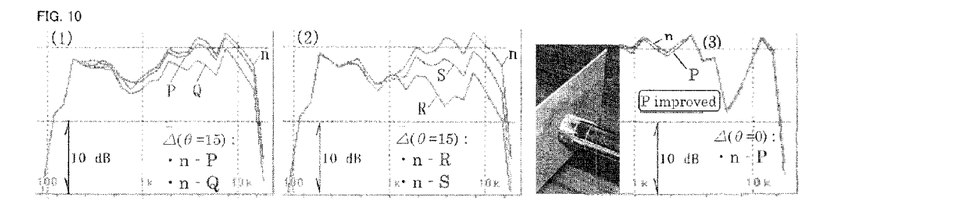
FIG. 10 is a view showing results of the sound transmission property of each sample measured by the measurement method 2.

The sound transmission property at the angle θ=0° and 15° formed by the speaker-microphone axis and the normal direction of the sound transmission material is evaluated using the following sound transmission materials P to R under the same conditions as the measuring method 1, except for the angle and the use of an FM tone burst used as a sound source. The results are shown in FIG. 10. The details of the sound transmission materials P to R used in this method are as follows.

P: the sound transmission material of the Example 1 is used.
Q: the sound transmission material formed by a method similar to that in the Example 1 except for that the porosity is 74% and the thickness is 1.10 mm is used.
S: the sound transmission material of the Example 2 is used.
R: the sound transmission material formed by a method similar to that in the Example 1 except for that the porosity is 65% and the thickness is 1.03 mm is used.

In the above samples denoted by Q and R, a material reinforced by applying a metal mesh thereto is used in addition to the sound transmission material.

As a result of the sound transmission property evaluation in the measuring method 2, in the sample P, it can be seen that a high sound transmission property is exhibited even when θ=15°. Namely, in the material of the Example 1, it can be seen that in the sound transmission property, there is little dependency of the incident angle of a sound, (Implementation Test of Sound Absorbing Structure: Comparison of Sound Absorption Coefficient α$_0$ of Back Sound Absorbing Material (GW) Between Presence and Absence of Sound Tansmission Material (TTP))

Figure 9:
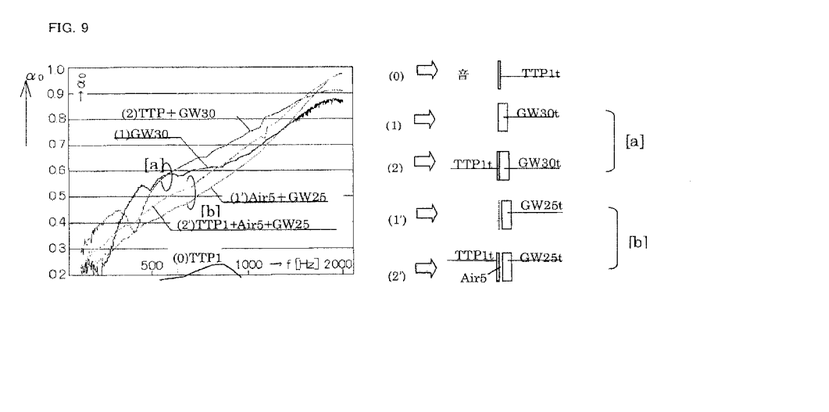
FIG. 9 is a view showing results of a comparative test of a sound absorption coefficient $\alpha_0$ of a back sound absorbing material (GW) in a case with the sound transmission material (TTP) and a case without the material.

The sound transmission material (Example 4) having a thickness of about 1 mm and glass wool (GW) are used as samples, and a sound absorption test is performed. The results are shown in FIG. 9. The horizontal axis represents frequency (Hz), and the vertical axis represents a vertical incident sound absorption coefficient $\alpha_0$.

[a] shows an $\alpha_0$ measured value of absence (1)/presence (2) of the sound transmission material (TTP) constituted only of glass wool (GW) having a thickness of 30 mm.

[b] shows the $\alpha_0$ measured value of absence (1')/presence (2') of TTP constituted only of glass wool (GW) having a thickness of 25 mm. In this structure, an air space of 5 mm is formed between TTP and GW.

According to the above results, (2) and (2') in which the sound transmission material (TTP) according to the present invention are provided on their surfaces each show a value equivalent to or more than the values of (1) and (1') in the case of using only GW, and it is suggested that there is the whole sound transmission property. In (0), $\alpha_0$ is not more than 0.2 in the case of using only TTP, and as a reflex portion it can be utilized in reverberation variability.

(Wind Noise Reduction Test)

Figure 11:
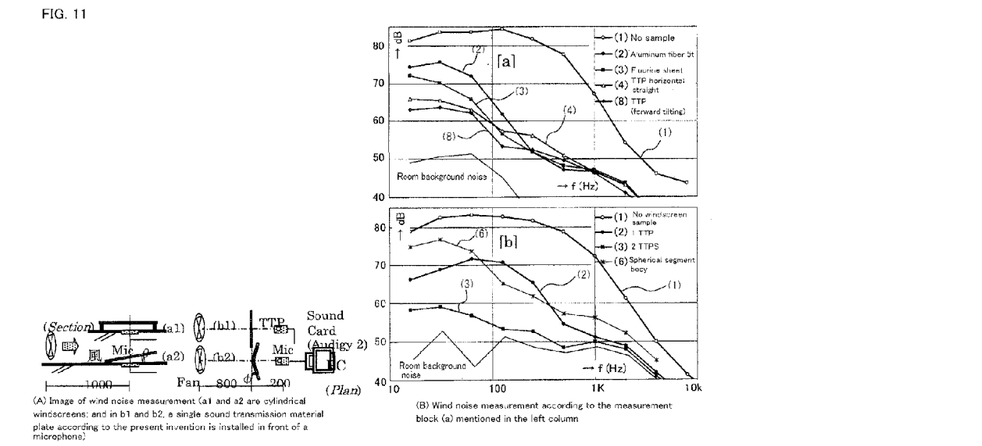
FIG. 11A is a view showing an outline of a system where a wind noise reduction test is performed.
FIG. 11B is a graph showing results of the wind noise reduction test.

A wind noise reduction test is performed by a system shown in FIG. 11A. In this test, a wind speed is 2.7 m/s. In a wind noise reduction effect evaluation test, wind is sent from a blower (FAN) at a position separated from a wall by a distance that allows ignorance of bounce of wind in a room, and a reduction degree S (dB) of a response measured in such a state that a windscreen manufactured using the sound transmission material is mounted is obtained, for each 1/1 octave band with respect to a microphone output response observed when there is no windscreen. The reduction degree S is represented as the wind noise reduction effect $\Delta S$ (dBA). The results are shown in FIG. 11B. In the samples of the Examples 1 to 4 and the comparative Examples 1 to 4, the wind, noise reduction test is similarly performed by a system shown in (b1). In the evaluation in table 1, "excellent" is not less than $\Delta 30$ dBA, "good" is not less than $\Delta 20$ dBA, and "inferior" is less than $\Delta 20$ dBA.

According to the present invention, since a material having a high sound transmission property while having a self-standing property can be obtained, the material can be used as a surface member of a sound absorbing wall surface structure and so on. As examples of the industrial applicability, the windscreen for a microphone, the protective grille, the sound transmission projection screen, and the speaker are shown above.

The invention claimed is:

1. A sound transmission material comprising fibers entangled with each other, the sound transmission material having TABER™ stiffness at least 5 mN·m, a bending resistance at least 100 mN, porosity more than 50%, and a thickness at most 3 mm.

2. The sound transmission material according to claim 1, wherein the fibers are metal fibers.

3. The sound transmission material according to claim 1, wherein an insertion loss is at most 5 dB in each of 1 octave band of 63 Hz to 8 kHz.

4. The sound transmission material according to claim 2, wherein the sound transmission material is a material obtained by compression molding the metal fibers.

5. A sound control plane structure comprising:
the sound transmission material according to claim 1; and
a sound control mechanism installed behind a back surface of the sound transmission material and having at least one of a sound absorbing structure and a reflectivity structure.

6. The sound control plane structure according to claim 5, wherein the sound control mechanism is a variable sound control mechanism which can change a placement ratio of at least one of the sound absorbing structure and the reflectivity structure.

7. The sound control plane structure according to claim 6 which is a sound control plane structure in at least one of an interior of a wall surface and a ceiling of the building, wherein the sound transmission material is disposed so that a space is formed between the sound transmission material and at least one of the wall surface and the ceiling of the building, the variable sound control mechanism has a curtain or a sound absorbing blind disposed in the space and configured to be openable and closable, and sound absorption characteristics of a plane are controlled by opening and closing the curtain or the blind.

8. The sound control plane structure according to claim 5 which is a sound control plane structure in at least one of an interior of a wall surface and a ceiling of a building, wherein the sound transmission material is disposed so that a space is formed between the sound transmission material and at least one of the wall surface and the ceiling of the building, and the sound control mechanism has at least one of a sound absorbing structure and a reflectivity structure disposed in the space.

9. An interior structure of a building, which has the sound control plane structure according to claim 5.

10. A windscreen for a microphone for reducing wind noise in the microphone comprising a sound transmission material disposed at a position of blocking wind to the microphone, wherein the sound transmission material is the sound transmission material according to claim 1.

11. A protective grille disposed on a front surface of a microphone or a speaker, which is constituted of the sound transmission material according to claim 1.

12. A sound transmission projection screen which has a frontal-projection-type projection surface and is used having a configuration in which a speaker is disposed behind the projection surface and a sound is produced from the speaker, at least the projection surface being constituted of the sound transmission material according to claim 1.

13. A speaker having a speaker box and a woofer unit, which includes a sound absorbing structure being installed in the speaker box;
the sound absorbing structure comprising:
the sound transmission material according to claim 1, a sound absorbing material formed of a porous sound absorbing material disposed behind the sound transmission material, and
an air space disposed behind the sound absorbing material; and
wherein the sound absorbing structure is provided in an inner wall of the speaker box.

14. The speaker according to claim 13, which is sound-isolating.

15. The sound transmission material according to claim 1, wherein said porosity is 60%-90%.

\* \* \* \* \*